United States Patent
Collett et al.

(10) Patent No.: US 9,609,290 B2
(45) Date of Patent: Mar. 28, 2017

(54) TELEPRESENCE METHOD AND SYSTEM FOR SUPPORTING OUT OF RANGE MOTION BY ALIGNING REMOTE CAMERA WITH USER'S HEAD

(71) Applicant: SUBC CONTROL LIMITED, Clarenville (CA)

(72) Inventors: Chad Joseph Collett, Clarenville (CA); Adam Paul Rowe, Clarenville (CA)

(73) Assignee: SubC Control Limited, Clarenville (CA)

( * ) Notice: Subject to any disclaimer, the term of this patent is extended or adjusted under 35 U.S.C. 154(b) by 408 days.

(21) Appl. No.: 13/938,725

(22) Filed: Jul. 10, 2013

(65) Prior Publication Data

US 2015/0015708 A1    Jan. 15, 2015

(51) Int. Cl.
*H04N 7/18* (2006.01)
*H04N 5/232* (2006.01)
*G06K 9/00* (2006.01)
*H04N 21/442* (2011.01)

(52) U.S. Cl.
CPC ............ *H04N 7/185* (2013.01); *H04N 5/232* (2013.01); *H04N 5/23206* (2013.01); *G06K 9/00221* (2013.01); *H04N 5/23219* (2013.01); *H04N 21/44218* (2013.01)

(58) Field of Classification Search
CPC .... H04N 7/185; H04N 5/232; H04N 5/23219; H04N 21/44218; H04N 5/23206; G06K 9/00221
See application file for complete search history.

(56) References Cited

U.S. PATENT DOCUMENTS

| | | | | |
|---|---|---|---|---|
| 6,118,888 A * | 9/2000 | Chino | ................. | G06F 3/011 382/118 |
| 6,133,944 A * | 10/2000 | Braun | ................. | H04N 5/232 345/31 |
| 6,202,713 B1 * | 3/2001 | Drescher | ............ | G01F 13/006 141/102 |
| 6,292,713 B1 * | 9/2001 | Jouppi | ................. | G06F 3/011 345/629 |
| 6,535,793 B2 * | 3/2003 | Allard | ................. | B25J 9/1689 318/628 |

(Continued)

FOREIGN PATENT DOCUMENTS

JP            07314355 A * 12/1995

OTHER PUBLICATIONS

International Patent Application No. PCT/CA2014/050658; International Search Report dated Sep. 11, 2014.

(Continued)

*Primary Examiner* — Jay Patel
*Assistant Examiner* — Joseph Suh
(74) *Attorney, Agent, or Firm* — Borden Ladner Gervais LLP; Jason R. Mueller-Neuhaus

(57) ABSTRACT

A telepresence system and method for aligning a remote pan and tilt system with the position of a user's head and for displaying to the user a first portion of the field of capture of the remote pan and tilt system. The pan and tilt system moves to track the movement of the user's head. When the pan and tilt system is in a misaligned position with the position of the user's head the image displayed to the user is a second portion of the field of capture of the remote pan and tilt system.

24 Claims, 11 Drawing Sheets

(56) References Cited

U.S. PATENT DOCUMENTS

| | | | | |
|---|---|---|---|---|
| 6,753,899 | B2* | 6/2004 | Lapalme | H04N 5/2252 340/505 |
| 6,768,563 | B1* | 7/2004 | Murata | H04N 7/181 348/211.11 |
| 6,867,798 | B1* | 3/2005 | Wada | H04N 7/183 348/143 |
| 6,977,672 | B1* | 12/2005 | Okuno | G08B 13/19656 348/160 |
| 7,312,766 | B1* | 12/2007 | Edwards | G02B 27/017 248/115 |
| 8,498,451 | B1* | 7/2013 | Agopian | H04M 1/27455 382/118 |
| 2002/0018072 | A1* | 2/2002 | Chui | H04N 1/3875 345/667 |
| 2002/0141768 | A1* | 10/2002 | Friedrich | G03G 15/0822 399/31 |
| 2003/0164900 | A1* | 9/2003 | Primeau | H04N 11/08 348/490 |
| 2004/0174129 | A1* | 9/2004 | Wang | B25J 5/007 318/568.12 |
| 2005/0059488 | A1* | 3/2005 | Larsen | A63F 13/10 463/36 |
| 2005/0280711 | A1* | 12/2005 | Ishii | H04N 5/232 348/207.99 |
| 2007/0044654 | A1* | 3/2007 | Schedgick | B60G 13/14 92/146 |
| 2007/0176898 | A1* | 8/2007 | Suh | G06F 1/1616 345/158 |
| 2007/0185587 | A1* | 8/2007 | Kondo | G08C 17/00 700/19 |
| 2008/0136916 | A1* | 6/2008 | Wolff | G06F 3/012 348/169 |
| 2008/0218582 | A1* | 9/2008 | Buckler | H04N 7/15 348/14.08 |
| 2009/0160957 | A1* | 6/2009 | Deng | G06T 7/2026 348/208.99 |
| 2009/0245600 | A1* | 10/2009 | Hoffman | A61B 1/00039 382/128 |
| 2009/0310741 | A1* | 12/2009 | Borghese | A61B 5/0064 378/37 |
| 2010/0176270 | A1* | 7/2010 | Lau | B25J 9/1692 250/203.2 |
| 2011/0032368 | A1* | 2/2011 | Pelling | G03B 37/02 348/211.9 |
| 2011/0054717 | A1* | 3/2011 | Yamauchi | G05D 1/0038 701/2 |
| 2011/0079703 | A1* | 4/2011 | Gunning, III | F41G 3/225 250/206.2 |
| 2012/0095619 | A1* | 4/2012 | Pack | G05D 1/0038 701/2 |
| 2012/0096126 | A1* | 4/2012 | Kamei | H04N 7/185 709/219 |
| 2012/0120264 | A1* | 5/2012 | Lee | G06T 7/20 348/208.4 |

OTHER PUBLICATIONS

International Patent Application No. PCT/CA2014/050658; International Preliminary Report on Patentability dated Jan. 21, 2016.

* cited by examiner

TELEPRESENCE METHOD AND SYSTEM FOR SUPPORTING OUT OF RANGE MOTION BY ALIGNING REMOTE CAMERA WITH USER'S HEAD

FIELD OF INVENTION

The present invention relates to telepresence and more particularly to a telepresence method and system for supporting out of range head movement of a user.

BACKGROUND

Telepresence technology enables a user positioned at a first location to feel as though they are present at a second remote location. Visual and audio information that is normally detected at the second location by the user is provided to the user's senses, artificially "immersing" the user in the remote environment. Advanced telepresence systems give the user the ability to change the 'point of view' of their environment simply by moving their head in the direction they wish to see.

A benefit of telepresence technology is the ability for humans to 'experience' a situation without being physically present. This is advantageous in harsh and limited access environments such as underground, underwater, extreme climates, and even outer space. The risks posed to humans by a harsh environment are eliminated, while still enabling the collection of environmental information. Vehicles and robots equipped with telepresence systems are used for various applications in harsh environments, such as in mining, deep sea applications, space exploration and sample collection, bomb removal, military applications, etc. However, the motion of the vehicle introduces aberrations into the user "experience"—mainly the image projected to the user. Furthermore, when the user is a passenger of a vehicle during a telepresence session, the movement of the vehicle also introduces unwanted motion to the system. For instance, on an ocean vessel the wave motion rocks the vessel, and thus rocks the user, influencing the image projected to the user.

It would be beneficial to provide a method and system that overcome at least some of the above-noted disadvantages.

SUMMARY OF THE EMBODIMENTS OF THE INVENTION

In accordance with an aspect of the invention there is provided a method comprising aligning a remote pan and tilt system with the position of a user's head to place the remote pan and tilt system in a first aligned position; providing a first image from the remote pan and tilt system in the first aligned position within a first field of capture of the remote pan and tilt system to a field of view of the user, the first image captured from a position of the remote pan tilt system correlating to a first relative position of the head of the user, the first image comprising a first portion of the field of capture of the remote pan and tilt system; moving the position of the head of the user to a second position and moving the remote pan and tilt system for alignment with the second position to place the remote pan and tilt system in a second misaligned position; providing a second image from the remote pan and tilt system in the second misaligned position within the first field of capture to the field of view of the user, the second image captured from a position of the remote pan and tilt system for correlating to a relative position of the user's head in the second position, the second image comprising a second portion of the field of capture of the remote pan and tilt system in the second misaligned position, the first portion other than the second portion.

In accordance with an aspect of the invention there is provided another method comprising selectably operating a pan and tilt system video feedback in a first mode of operation and a second other mode of operation, the first mode of operation selected when motion of a head of a user is within a first range of motion of the pan and tilt system and a second mode of operation selected when motion of the head of the user is outside the first range of motion of the pan and tilt system; while in the first mode of operation, providing a first image from the remote pan and tilt system within a field of capture of the remote pan and tilt system to a field of view of the user, the first image captured from a position of the remote and pan tilt system correlating to a first relative position of the head of the user, the first image consisting of a first portion of the field of capture of the remote pan and tilt system; while in the second mode of operation, providing a second image within the first field of capture to the field of view of the user, the second image correlating to a relative position of the head of the user, the second image consisting of a second portion of the field of capture of the remote pan and tilt system, the first portion other than the second portion.

In accordance with an aspect of the invention there is provided a system comprising a sensor for sensing the position of a head of a user; a pan and tilt apparatus for moving in alignment with the sensed position of the head of the user and for capturing an image of the environment within the field of capture of the pan and tilt apparatus; a display for displaying a portion of the image captured by the pan and tilt apparatus, the portion other than the entire captured image; wherein a first portion of the image is captured within the field of capture of the pan and tilt system from a position of the remote pan tilt system correlating to a first sensed position of the head of the user and a second portion of the image is captured within the field of capture of the pan and tilt system from a position of the remote pan tilt system other than correlating to a second sensed position of the head of the user, the first sensed position other than the second sensed position.

DETAILED DESCRIPTION OF THE EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
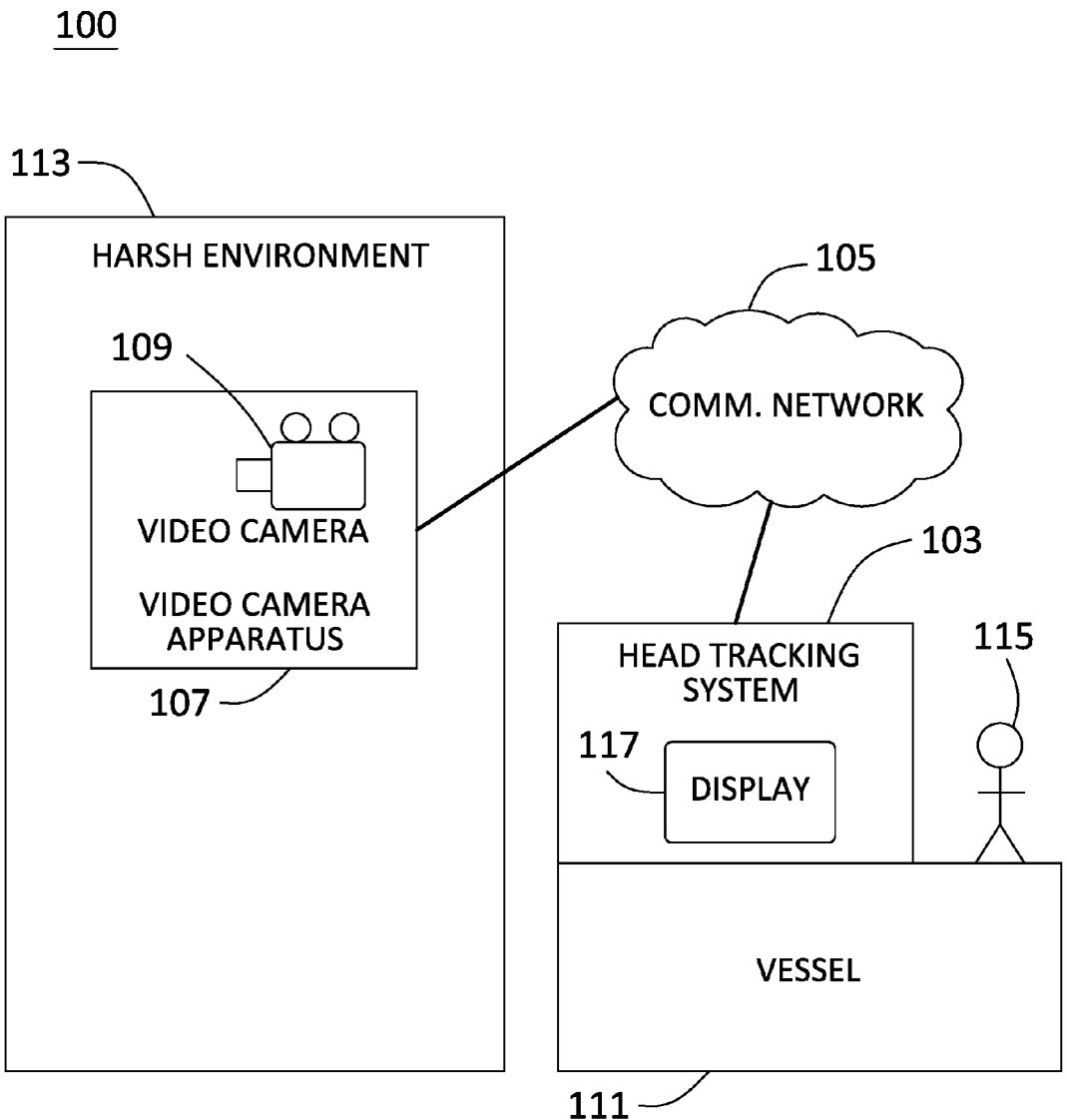
FIG. 1 is a simplified block diagram of a prior art telepresence system.

Shown in FIG. 1, is a simplified block diagram of a prior art telepresence system 100 comprising a user head tracking system 103 coupled to a communication network 105, and a video camera apparatus 107, also coupled to the communication network 105. The video camera apparatus 107 controls three-dimensional movement of video camera 109 intended for exploring harsh environment 113, for example a region of the ocean floor. User 115 is located on a vehicle remote from harsh environment 113, for example a vessel 111 on the ocean surface. The head of user 115 is monitored by head tracking system 103, such that upon movement of the user's head, the head tracking system 103 transmits data indicative of the movement to the video camera apparatus 107. The video camera 109 moves in synchronous motion to the head of user 115, and the video camera apparatus 107 transmits video information to display 117 of the head tracking system 103. Movement of vessel 111 caused by ocean waves is also sensed by head tracking system 103, however, it is not differentiated from the intended motion of the user's head. Thusly, the image displayed to user 115 on display 117 moves with the heave of the vessel 111. Furthermore, any other motion of vessel 111 has a similar undesired effect on the image displayed on display 117.

Figure 2:
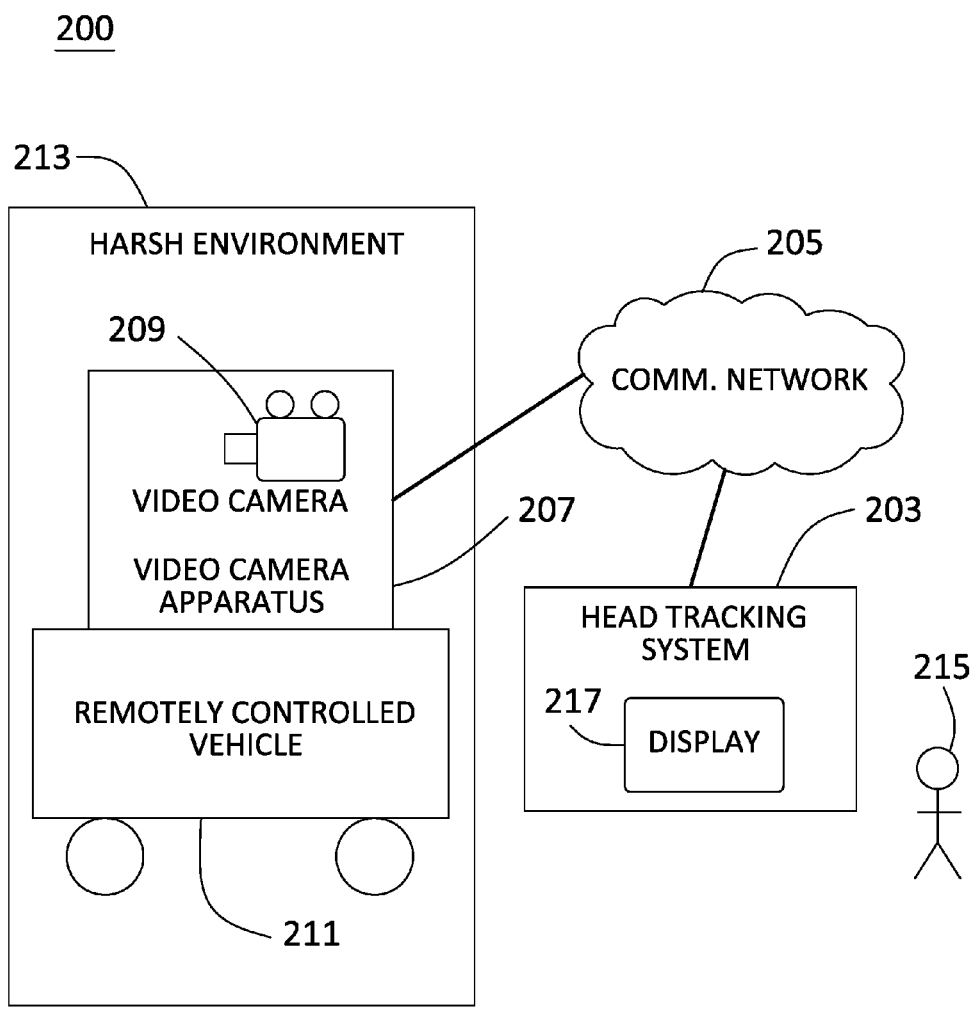
FIG. 2 is a simplified block diagram of another prior art telepresence system.

Shown in FIG. 2 is another simplified block diagram of a prior art telepresence system 200 comprising a user head tracking system 203 coupled to a communication network 205 and a video camera apparatus 207, also coupled to the communication network 205. The video camera apparatus 207 controls three-dimensional movement of video camera 209 and is attached to a remotely controlled vehicle 211, intended for exploring harsh environment 213. User 215 is located remotely from harsh environment 213. The head of user 215 is monitored by head tracking system 203, such that upon movement of the user's head, the head tracking system 203 transmits data indicative of the movement to the video camera apparatus 207. Video camera 209 moves in synchronous motion to the head of user 215, and the video camera apparatus 207 transmits captured video information to display 217 of the head tracking system 203. Vibration of remotely controlled vehicle 211 causes the video camera 209 to vibrate and this high speed movement translates to a vibration of the image displayed on the display 217. Furthermore, as the remotely controlled vehicle 211 travels along the contour of the landscape, it may tilt or move in other unwanted directions having undesired effects on the image that is displayed on display 217.

Figure 3:
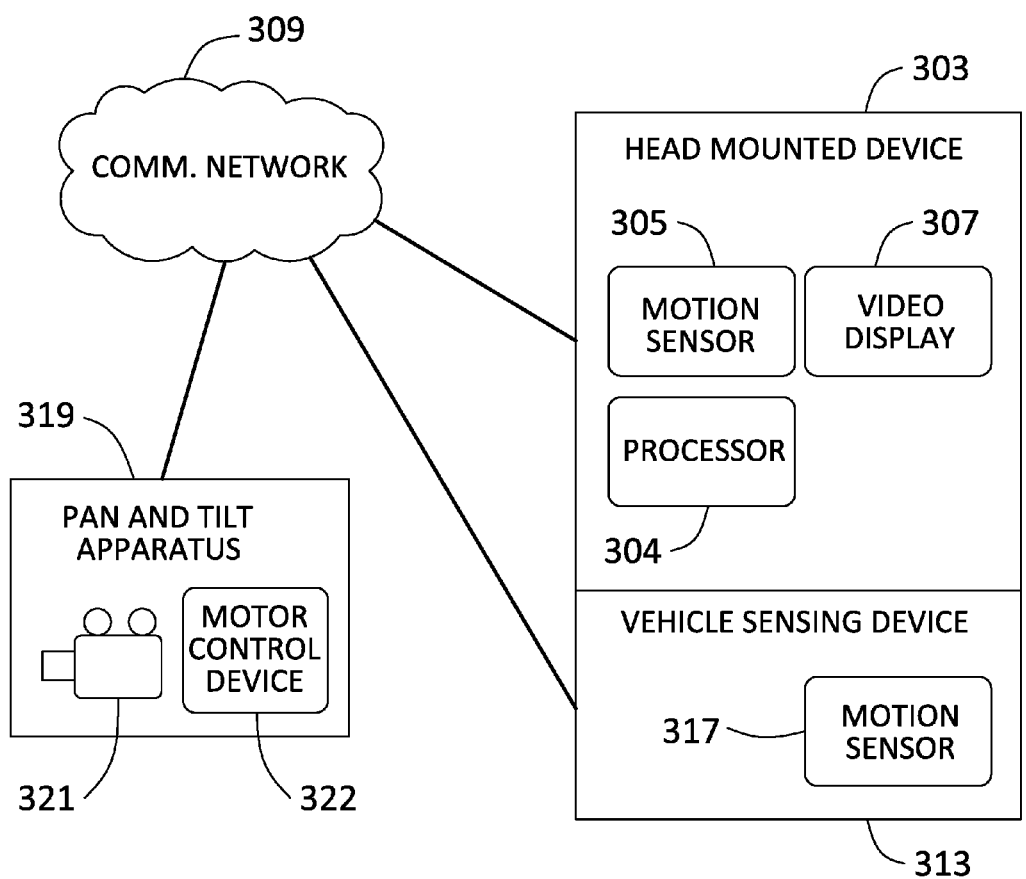
FIG. 3 is a simplified block diagram of a head tracking telepresence system with a vehicle sensing device coupled to a head mounted device.

Shown in FIG. 3 is a simplified block diagram of a head tracking telepresence system according to an embodiment of the invention. Telepresence system 300 comprises a head mounted device 303, pan and tilt apparatus 319, vehicle sensing device 313, all of which are coupled to communication network 309. The user is a passenger of the vehicle. Communication technology used in communication network 309 includes, but is not limited to, fibre optic, wireless, coax, twisted pair, or a combination of communication technologies. Further optionally, communication network 309 comprises a LAN, WAN, the Internet, point-to-point configuration, or any network combination thereof.

Head mounted device 303 is formed to securely fit onto the head of a user (not shown) and comprises a motion sensor 305 for sensing the directional movement of the user's head, video display 307, and processor 304. Alternatively, the video display 307 is other than coupled to the head mounted device 303. The processor transmits movement instruction data primarily based on the directional movement of the user's head to the pan and tilt apparatus via the communication network 309. Optionally, the telepresence system processor 304 is located on a server (not shown) coupled to network 309.

Optionally, head mounted device 303 also comprises a speaker (not shown). Optionally, head mounted device 303 comprises a plurality of speakers to provide stereo sound to a user.

Pan and tilt apparatus 319 comprises video camera 321 and motor control device 322. Optionally, the pan and tilt apparatus 319 comprises a plurality of video cameras for providing stereoscopic vision to the user (not shown) on display 307. The motor control device 322 moves the video camera 321 in the direction indicated by the received movement instruction data from the head mounted device 303. Furthermore, the image captured by the video camera 321 is translated into video data and is transmitted to the head mounted device 303 via the communication network 309. The image is then displayed on the video display 307 of the head mounted device 303. In some embodiments the image is displayed on a video screen or a plurality of video screens.

Vehicle sensing device 313 is coupled to a vehicle (not shown) of which the user is a passenger, and comprises a motion sensor 317. Motion sensor 317 senses the motion of the vehicle. Vehicle motion data, indicative of the motion of the vehicle, is transmitted to the head mounted device 303 via communication network 309. Alternatively, the vehicle motion data is transmitted directly to head mounted device 303.

The vehicle's movement is also sensed by head tracking apparatus 303 since the user is located in the vehicle, however, the vehicle's movement is not discernable by motion sensor 305 separate from the motion of the user's head. Accordingly, if the movement instruction data for instructing the movement of the video camera 321 is based solely on the motion sensed by motion sensor 305—of the head mounted device 303—then the pan and tilt apparatus not only moves synchronously to the user's head, but also to the movement of the vehicle. As such, the image displayed on video display 307 also moves with the movement of the vehicle. To remove the effect of the vehicle's motion on the pan and tilt apparatus 319, processor 304, using the received vehicle motion data sensed by motion sensor 317, removes the error introduced by the movement of the vehicle from the sensor 305 data, and transmits movement instruction data to the pan and tilt apparatus based on the motion of the user's head relative to the motion of the vehicle. Reduction of the effect of the vehicle motion on the telepresence system provides a more realistic and less nauseating experience to the user.

Similarly, if the user does not move their head while the vehicle is moving, then pan and tilt apparatus 319 remains stationary.

Figure 4:
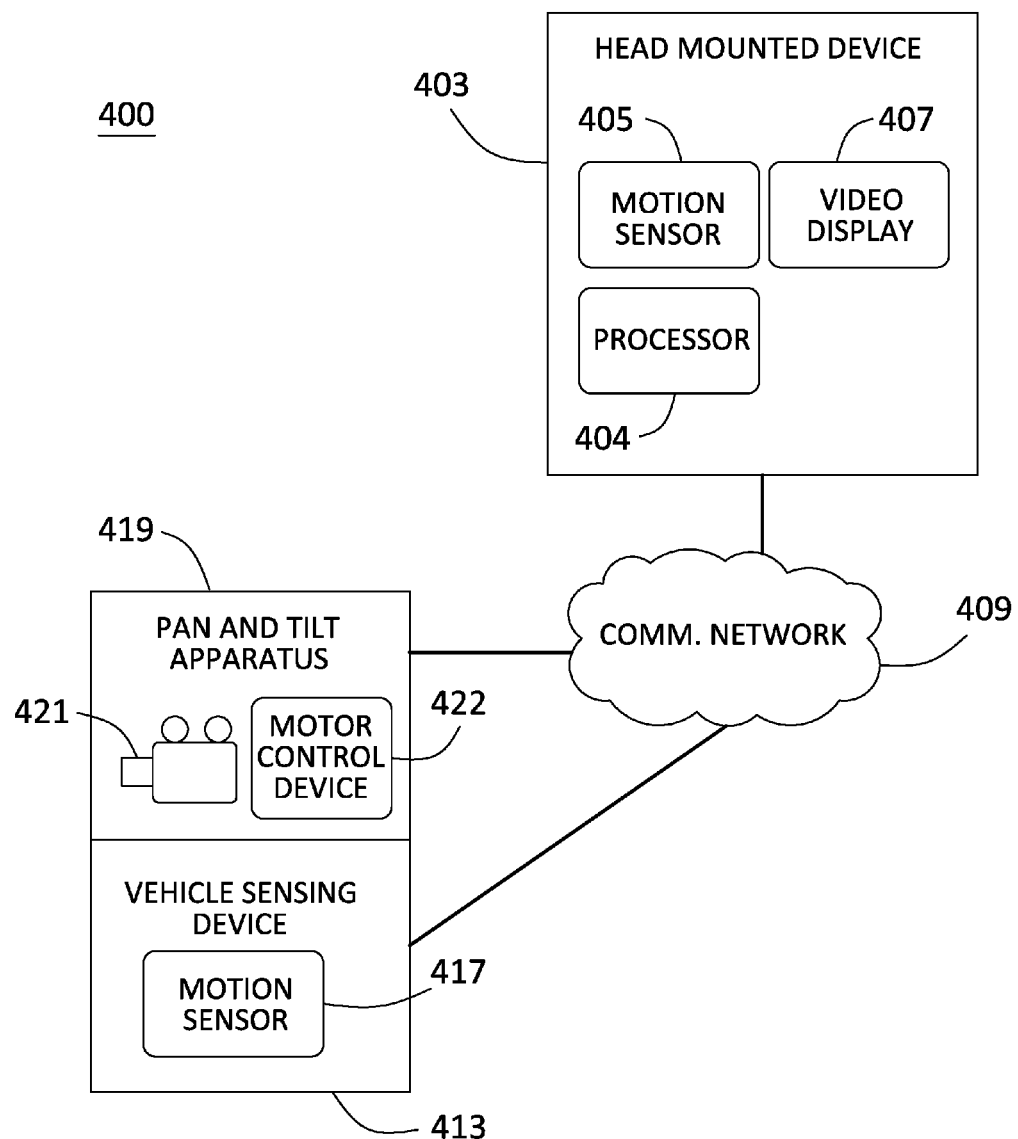
FIG. 4 is a simplified block diagram of another head tracking telepresence system with a vehicle sensing device coupled to a pan and tilt system.

Shown in FIG. 4 is a simplified block diagram of another telepresence system according to an embodiment of the invention. Telepresence system 400 comprises a head mounted device 403, pan and tilt apparatus 419, vehicle sensing device 413, all of which are coupled to communication network 409. Communication technology used in communication network 409 includes, but is not limited to, fibre optic, wireless, coax, twisted pair, or a combination of communication technologies. Further optionally, communication network 409 comprises a LAN, WAN, the Internet, point-to-point configuration, or any network combination thereof.

Head mounted device 403 is formed to securely fit onto the head of a user (not shown) and comprises a motion sensor 405, for sensing the directional movement of the user's head, video display 407, and processor 404. Alternatively, the video display 407 is other than coupled to the head mounted device 403. The processor transmits movement instruction data primarily based on the directional movement of the user's head to the pan and tilt apparatus 419 via the communication network 409. Optionally, the telepresence system processor 404 is located on a server (not shown) coupled to network 409.

Optionally, head mounted device 403 also comprises a speaker (not shown). Optionally, head mounted device 403 comprises a plurality of speakers to provide stereo sound to a user.

Pan and tilt apparatus 419 comprises video camera 421 and motor control device 422. Optionally, the pan and tilt apparatus 419 comprises a plurality of video cameras for providing stereoscopic vision to the user (not shown) on display 407. The motor control device 422 moves the video camera 421 in the direction indicated by the received movement instruction data from the head mounted device 403. Furthermore, the image captured by the video camera 421 is translated into video data and is transmitted to the head mounted device 403 via the communication network 409. The image is then displayed on the video display 407 of the head mounted device 403. In some embodiments the image is displayed on a video screen or a plurality of video screens.

Vehicle sensing device 413 comprises motion sensor 417 and is coupled to a vehicle (not shown), to which the pan and tilt apparatus 419 is also coupled. Motion sensor 417 senses motion of the vehicle. Vehicle motion data, indicative of the motion of the vehicle, is transmitted to the head mounted device 403 via communication network 409.

If the movement instruction data for instructing the movement of the video camera 421 is based solely on the motion sensed by motion sensor 405, of the head mounted device 403, then the video camera 421 moves synchronously to the user's head, however the entire pan and tilt apparatus 419 moves with the movement of the vehicle to which it is affixed. As such, the image displayed to the user also moves with the movement with the vehicle 413.

To reduce the effect of the vehicle's motion on the image displayed to the user, processor 404, based on the sensor 405 data and the vehicle motion data, transmits movement instruction data to the pan and tilt apparatus 419 that counters the error introduced by the movement of the vehicle. Reduction of the effect of the vehicle motion on the telepresence system provides a more realistic and less nauseating experience to the user.

Alternatively, error introduced to the telepresence system by the movement of the vehicle is other than corrected. For example, a pan and tilt apparatus of a telepresence system is coupled to a vehicle comprising a remote control robotic arm. A user of the telepresence system navigates the robotic arm in an attempt to collect a specimen, such as a rock. The vibration of the vehicle engine causes the robotic arm to also vibrate. To more accurately visualize the true movement of the robotic arm relative to the rock the user turns the automatic error correction 'OFF.' A specific and non-limiting example is the user turns a switch to the 'OFF' position. Alternatively, the user provides an 'OFF' command via a console of the telepresence system. Alternatively, the user provides a verbal command to turn the automatic error correction 'OFF.' The vibration of the vehicle is then apparent on the image displayed to the user. On the other hand, if the automatic error correction remains 'ON', the image does not vibrate and therefore does not represent a realistic view of the actual movement of the robotic arm relative to the rock.

Figure 5:
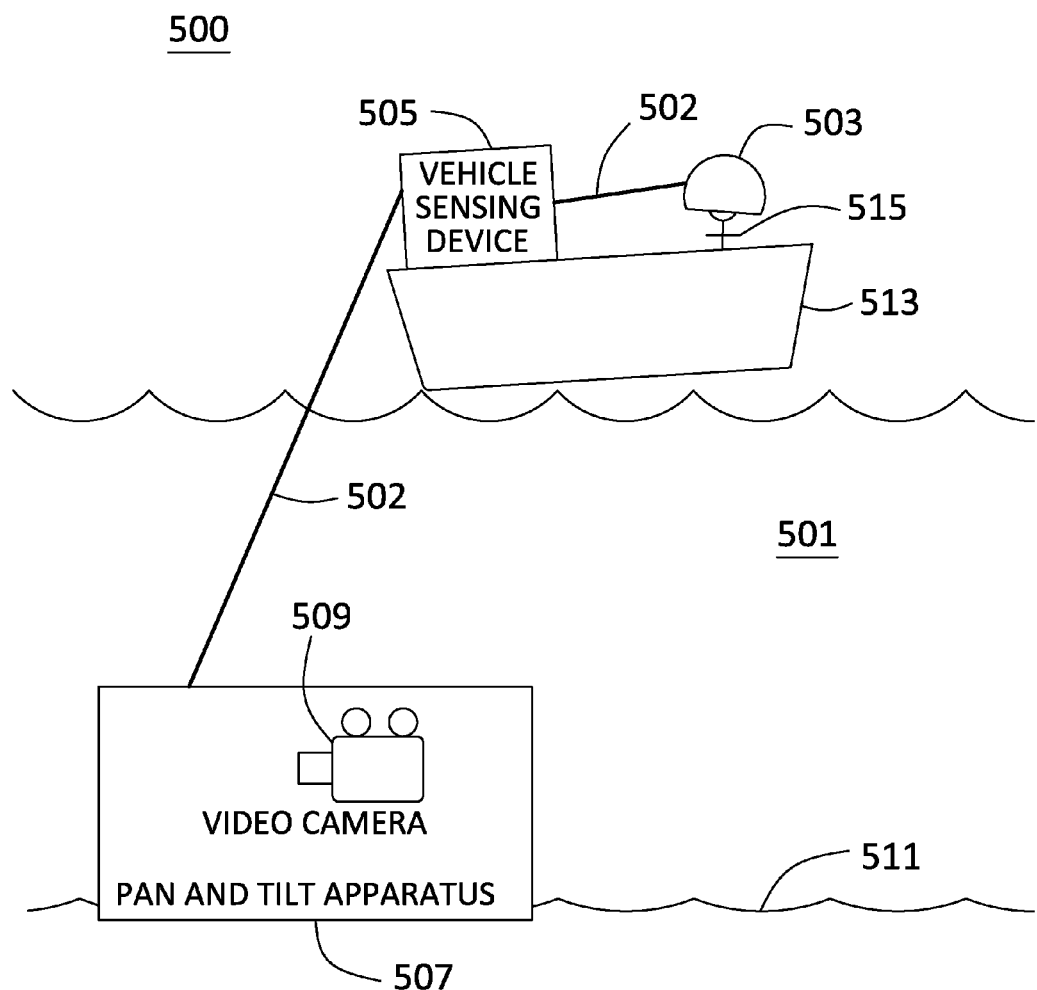
FIG. 5 is a simplified block diagram of a head tracking telepresence system wherein vehicle movement error is detected and removed.

Referring now to FIG. 5, shown is a simplified block diagram of a head tracking telepresence system according to an embodiment of the invention. Telepresence system 500 comprises head mounted device 503, vehicle sensing device 505 and pan and tilt apparatus 507, all of which are coupled to communication network 502. In this example, network 502 comprises a point-to-point network. Optionally, communication network 502 comprises a LAN, WAN, the Internet, point-to-point configuration, or any network combination thereof. Optionally, communication technology used in communication network 502 includes, but is not limited to, fibre optic, wireless, coax, twisted pair, or a combination of communication technologies.

Head mounted device 503 is formed to fit securely onto the head of a user 515, and comprises a motion sensor for sensing the directional movement of the user's head and a video display. Alternatively, the video display is other than coupled to the head mounted device. In this example, head mounted device 503 is in the form of a helmet and the video display comprises a video screen positioned on the helmet visor for viewing by the user 515. Optionally, the head mounted device 503 is other than a helmet and comprises a video display for viewing by user 515. Vehicle sensing device 505 is coupled to a vehicle, for example a ship 513 on ocean 501, and comprises a motion sensor for sensing the motion of the ship 513. User 515 is a passenger of ship 513. Ship motions include, but are not limited to, roll, pitch and yaw. The ship may also vibrate due to the ship's engine or other equipment running. Pan and tilt apparatus 507 is located on the ocean floor 511 and comprises a video camera 509. Optionally, the pan and tilt apparatus 507 comprises a plurality of video cameras for providing stereoscopic vision to the user 515 on display (not shown). In some embodiments the image is displayed on a video screen or a plurality of video screens. Pan and tilt apparatus 507 moves the video camera 509 in three-dimensions based on instructions provided by a telepresence system processor. In this example, vehicle sensing device 505 comprises the telepresence system processor. Optionally, head mounted device 503 comprises the telepresence system processor. Optionally, the telepresence system processor (not shown) is located on a server (not shown) coupled to network 502.

The motion of the user's head is sensed by the head mounted device 503 and an indication of the motion of the user's head is transmitted to the telepresence system processor via communication network 502. Meanwhile, ship 513 is moving under the influence of the ocean 501 waves, for example, causing ship 513 to pitch up and down. The movement of ship 513 is sensed by the head mounted device, however, the ship motion is not discernable from the motion of the user's head.

If the movement instruction data for instructing the movement of the video camera 509 is based solely on the motion sensed by the head mounted device 503, then the video camera 509 moves synchronously to the user's head, however the video camera 509 also moves with the movement of ship 513. For example, in response to the user moving their head to the right, the video camera 509 also move to the right. Additionally, however, the video camera 509 also moves up and down in response to the movement of ship 513. As such, the image displayed to the user represents the field of view to the right side of the pan and tilt apparatus, and is constantly moving up and down.

To remove the effect of the ship's motion on the video camera 509 movement, and thus the image that is displayed to user 515, the telepresence system processor removes the error introduced by the movement of ship 513 from the head mounted device 503 sensor data, and transmits movement instruction data to pan and tilt apparatus 507 based on the motion of the user's head relative to the motion of ship 513. Reduction of the effect of ship 513 motion on the telepresence system provides a more realistic and less nauseating experience to the user 515.

Alternatively, ship 513 is vibrating, and the processor removes the error introduced by the vibration of ship 513 from the head mounted device 503 sensor data, and transmits movement instruction data to pan and tilt apparatus 507 based on the motion of the user's head relative to the motion of ship 513. Alternatively, the vehicle is other than a ship. Alternatively, the vehicle is a terrestrial vehicle.

Alternatively, removal of the error introduced by the movement of ship 513 is achieved by counter rotating the movement of the video camera 509 relative to the ship 513. For example, when the ship turns 3 degrees north, the user view automatically turns 3 degrees south to keep a consistent gaze.

Upon removal of an error introduced to a telepresence system by the movement of a vehicle, as described in the embodiments above, an indication that the error is being removed is provided to the user. For example, a telepresence system counter-rotates the movement of a video camera relative to the movement of a vehicle the pan and tilt apparatus is coupled thereto. During the counter-rotation movement of the video camera an indication of the ongoing error correction is provided to the user. A specific and non-limiting example is a visual cue such as a light flashing. Alternatively, an audible cue is provided to the user. Alternatively, a portion of the telepresence system vibrates to indicate the ongoing error autocorrection to the user.

Figure 6:
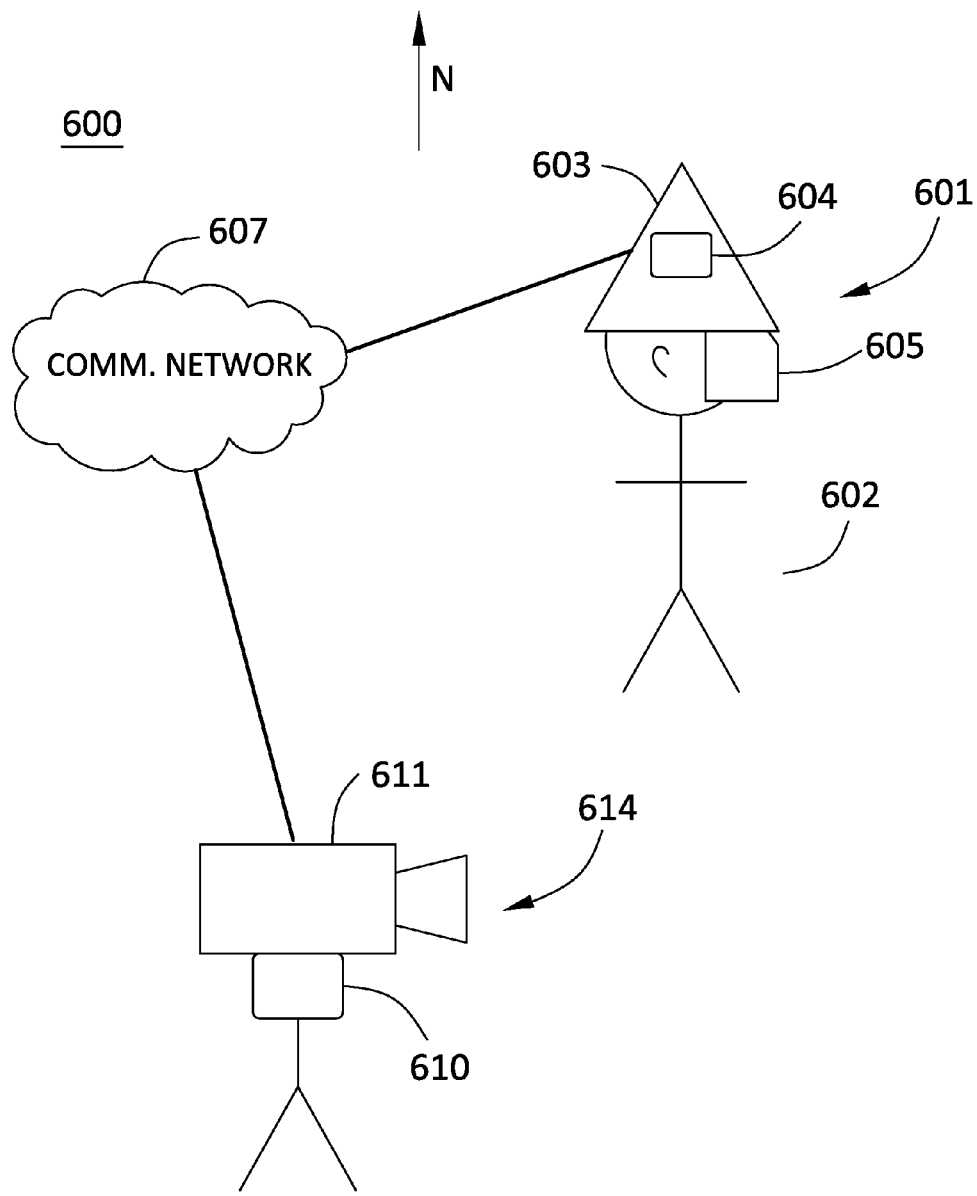
FIG. 6 is a simplified block diagram of another head tracking telepresence system wherein the telepresence system becomes misaligned.

Now referring to FIG. 6, shown is a simplified embodiment of another head tracking telepresence system according to an embodiment of the invention. Telepresence system 600 comprises a head mounted device 601, pan and tilt apparatus 614 and a communication network 607. Both of the head mounted device 601 and pan and tilt apparatus 614 are coupled to the communication network 607. The telepresence system also comprises a processor (not shown) coupled to the communication network 607 for processing data. In this example, head mounted device 601 comprises a helmet 603, display 605 and motion sensor 604 for sensing the movement of the head of user 602. Alternatively, the head mounted device comprises other than a helmet. Alternatively, the head mounted device comprises an apparatus for fixing a display to a user's head. Alternatively, the video display 605 is other than coupled to the head mounted device 601. Pan and tilt apparatus 614 is located remotely from user 602 and comprises video camera 611 and motor 610 for moving the camera in 3 dimensions. Alternatively, the pan and tilt apparatus 614 comprises a plurality of video cameras for providing stereoscopic vision to the user 602 on display 605. Further alternatively, a plurality of motors are used for moving the cameras in 3 dimensions.

As the user 602 moves their head to various positions, instructions are transmitted to the pan and tilt apparatus 614, via the communication network 607, instructing the pan and tilt apparatus 614 to move the video camera 611 such that it tracks the movement of the user's head. The movement of the pan and tilt apparatus 614 may lag the movement of the user's head. The lag depends on the speed of the user's head and the response time of the telepresence system, and possibly also the distance between the user 602 and telepresence system 614. Video data is transmitted via the communication network 607 for displaying the images captured by the video camera 611 on display 605. For example, user 602 moves their head east, sensor 604 detects the motion, and instructions are transmitted via communication system 607 instructing the pan and tilt apparatus 614 to point toward the east. Motor 610 moves the video camera 611 east. Image data showing east is transmitted back to head mounted device 601 via communication network 607. As the user 602 moves their head, the pan and tilt apparatus 614 follows, constantly transmitting video data for viewing by the user. User 602 is 'virtually immersed' in the environment of the pan and tilt apparatus 614. In some embodiments the image is displayed on a video screen or a plurality of video screens.

For example, the user's head located in position {x1, y1, z1} corresponds to the pan and tilt apparatus 614 position of {x1', y1', z1'}, the user's head located in position {x2, y2, z2} corresponds to the pan and tilt apparatus 614 position of {x2', y2', z2'}, and so forth.

Simultaneous to the movement of the user's head, feedback data indicating the position of the pan and tilt apparatus 614 is provided to the processor. Also provided to the processor is the position of the user's head. While in use, the pan and tilt apparatus comes out of alignment with the position of the user's head. For example, the user's head is in position {x1, y1, z1} however the pan and tilt apparatus 614 is in position {x3', y3', z3'}. Comparing the feedback data with the known position of the user's head, the misalignment is automatically detected by the processor. For continued use of the telepresence system, the misalignment is corrected. Optionally, the telepresence system automatically corrects the misalignment. For example, pan and tilt apparatus 614 automatically moves to the position {x4', y4', z4'} that corresponds to the current position of the user's head {x4, y4, z4}. Then the telepresence system resumes normal operation of tracking the user's head.

Optionally, the telepresence system provides an indication to the 602 that a misalignment has occurred. For example, a visual cue appears on the display indicating to user 602 that the telepresence system is misaligned. Alternatively, an audible cue is provided to the user. Alternatively, a portion of the telepresence system vibrates to indicate a misalignment to user 602.

Still referring to FIG. 6, upon detection of misalignment between the position of the user's head and the pan and tilt apparatus 614, a cue indicating the misalignment requires correction is provided to the user. For example, a text message appears on the display 605. To correct for the misalignment, a position {x1, y1, z1} is displayed on the display for guiding the user to move their head to that position. The user 614 moves their head to position {x1, y1, z1}. The pan and tilt apparatus 614 moves to the corresponding position {x1', y1', z1'}. Then the telepresence system resumes normal operation of tracking the user's head. Alternatively, the telepresence system mechanically guides the user's head to position {x1, y1, z1} and pan and tilt apparatus 614 moves to the corresponding position. Alternatively, user 602 is requested to move their head to a previously known position and the pan and tilt apparatus moves to the corresponding position.

A pan and tilt apparatus has a known range of motion determined by physical limitations of the telepresence system. For example, pan and tilt apparatus 614 other than moves 360° in any direction. In this example, the motor limits the range of motion of the video camera to 90° from the origin in the x, y and z coordinate system. However, many users have the ability to turn their heads left and right beyond 90°. Misalignment between a position of the user's head and a pan and tilt apparatus may be due to the user extending their head beyond the limits of the range of motion of the pan and tilt apparatus. When misalignment due to a range of motion error is detected by the telepresence system a cue indicating the cause of the misalignment is provided to the user. For example, a text message such as 'out of range" appears on the display of a head mounted device. Alternatively, an audible cue is provided to the user. Alternatively, a portion of the telepresence system vibrates to indicate the cause of misalignment to the user. Upon receiving a misalignment cue, the user is commanded by the telepresence system to return their head to a position corresponding to a position within the range of motion of the pan and tilt apparatus. Alternatively, the user is prevented by mechanical means from moving their head to a position corresponding to a position outside the range of motion of the pan and tilt apparatus. Once misaligned, the telepresence system is realigned by one of the methods described above.

Figure 7:
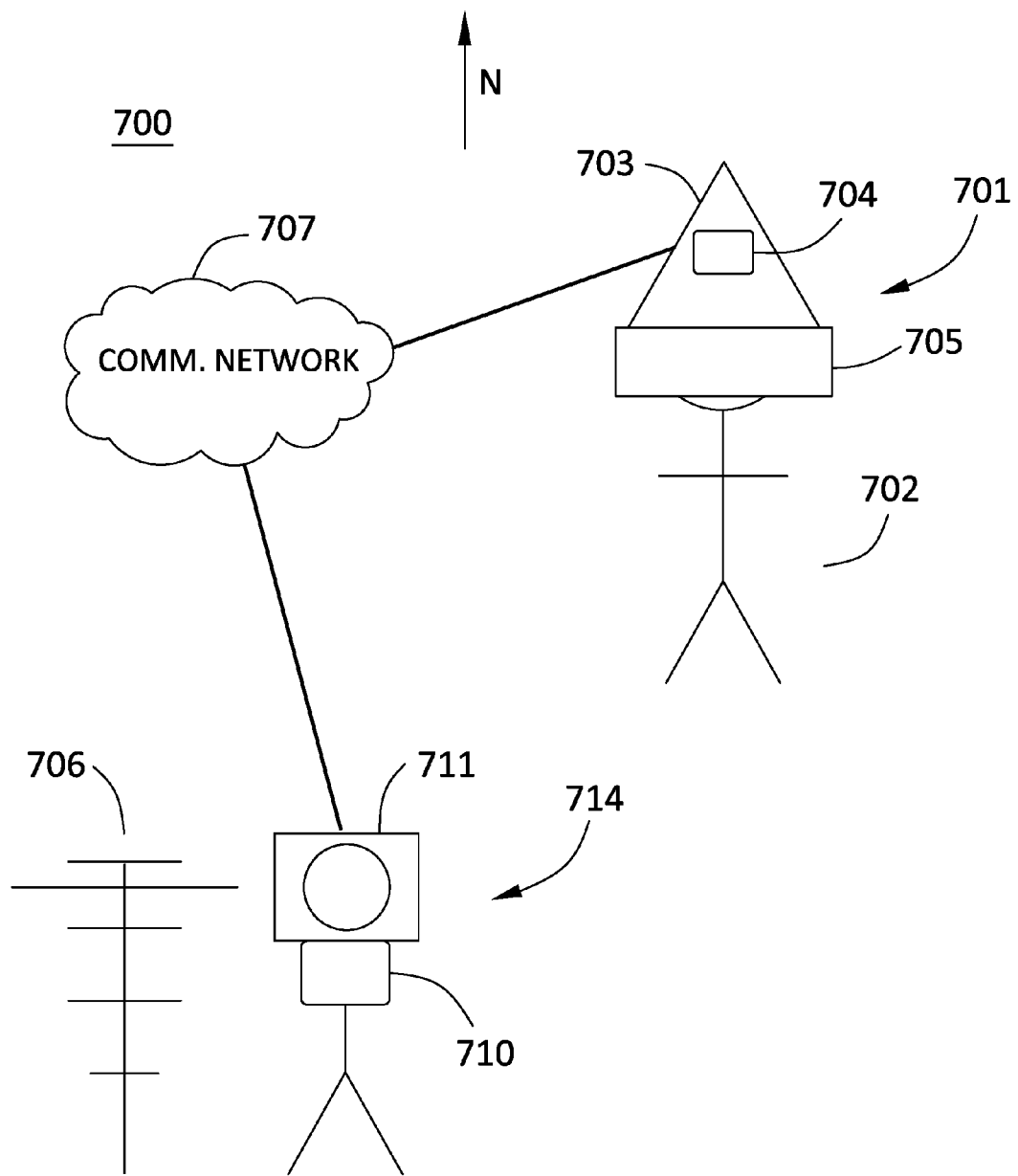
FIG. 7 is a simplified block diagram of a head tracking telepresence system obstructed by an object.

An obstruction to the movement of the pan and tilt apparatus also causes a misalignment between the position of the user's head and the pan and tilt apparatus. Shown in FIG. 7, is a simplified block diagram of a head tracking telepresence system obstructed by an object. Telepresence system 700 comprises a head mounted device 701, pan and tilt apparatus 714 and a communication network 707. Both the head mounted device 701 and pan and tilt apparatus 714 are coupled to communication network 707. The telepresence system also comprises a processor (not shown) coupled to the communication network 707 for processing data. In this example, head mounted device 701 comprises a helmet 703, display 705 and motion sensor 704 for sensing the movement of the head of user 702. Alternatively, the video display 705 is other than coupled to the head mounted device 701. Alternatively, the head mounted device comprises other than a helmet. Alternatively, the head mounted device comprises an apparatus for fixing a display to the user's head. Pan and tilt apparatus 714 is located remotely from user 702 and comprises video camera 711 and motor 710 for moving the camera in 3 dimensions. Alternatively, the pan and tilt apparatus 714 comprises a plurality of video cameras for providing stereoscopic vision to the user 702. Further alternatively, a plurality of motors are used for moving the cameras in 3 dimensions. In some embodiments the image is displayed on a video screen or a plurality of video screens.

West of the pan and tilt apparatus 714 is plant 706. User 702 moves their head directly west. Pan and tilt apparatus 714 tracks the movement of the user's head, however, it is obstructed by plant 706 and cannot move directly west. The telepresence system detects the misalignment caused by the obstruction. For example, by comparing feedback data comprising an indication of the position of pan and tilt apparatus 714 with the sensed position of the user's head, the misalignment is automatically detected by the processor. As the user's head position other than corresponds to a position outside the range of motion of the pan and tilt apparatus 714, the misalignment is deemed to be due to an obstruction and the user 702 is notified. For example, a text message appears on display 705. To correct for the misalignment due to an obstruction, a position {x1, y1, z1} is displayed on the display for guiding the user to move their head to that position. The user 714 moves their head to position {x1, y1, z1}. The pan and tilt apparatus 714 moves to the corresponding position {x1', y1', z1'}. Then the telepresence system resumes normal operation of tracking the user's head. Alternatively, the telepresence system mechanically guides the user's head to position {x1, y1, z1} and the pan and tilt apparatus moves to the corresponding position {x1', y1', z1'}. Alternatively, user 702 is requested to move their head to a previously known position and the pan and tilt apparatus moves to the corresponding position. Of course the user is not guided to a position that is unattainable due to the obstruction of plant 706. Alternatively, obstruction of the pan and tilt apparatus is determined by another method.

Figure 8:
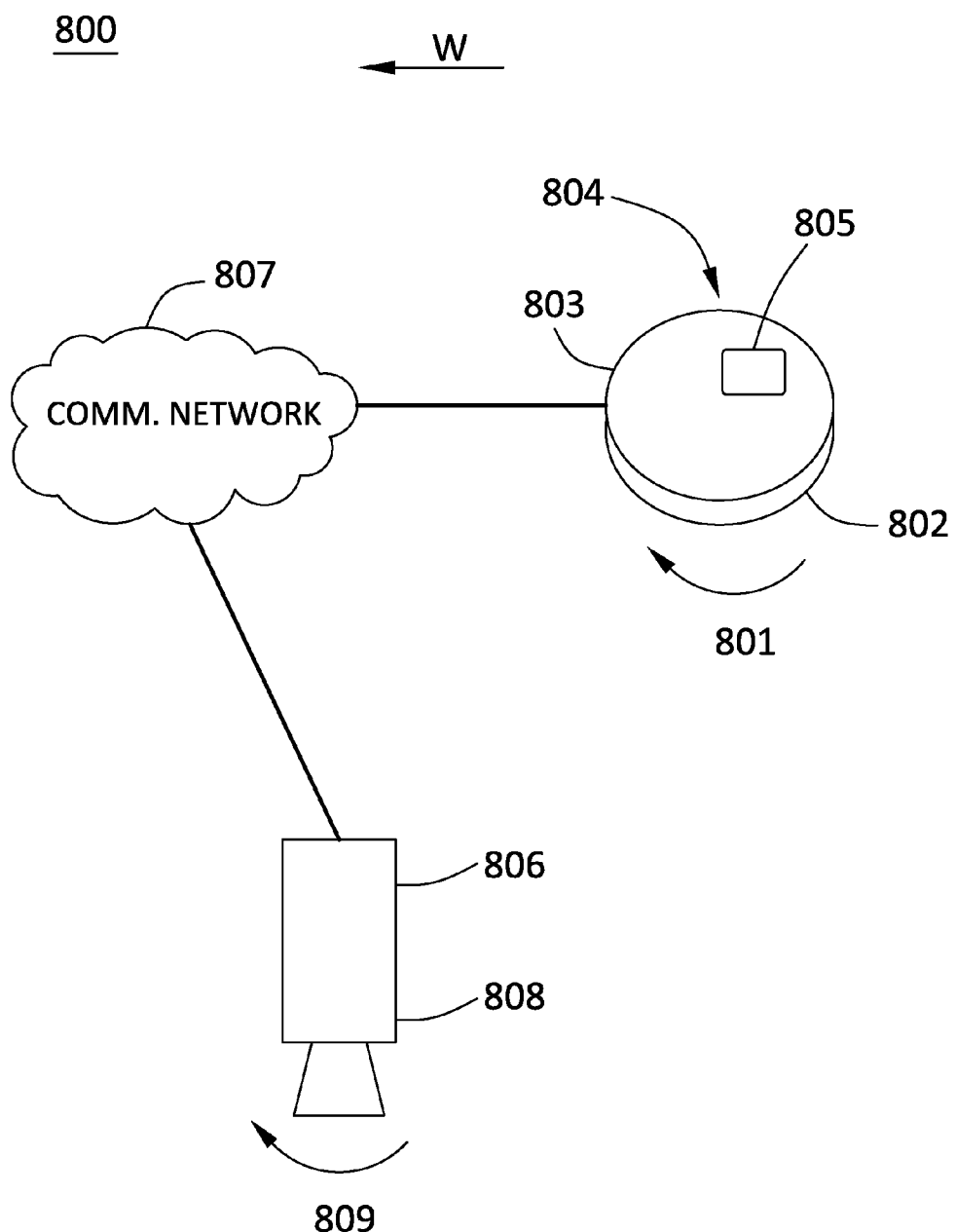
FIG. 8 is a top view of a simplified block diagram of a head tracking telepresence system with a delayed response.

A delay in reaction time of the telepresence system also causes a misalignment between the position of the user's head and the pan and tilt system. Shown in FIG. 8, is a top view of a simplified block diagram of a telepresence system according to an embodiment of the invention. Telepresence system 800 comprises a head mounted device 804, pan and tilt apparatus 806 and a communication network 807. Both the head mounted device 804 and pan and tilt apparatus 806 are coupled to the communication network 807. The telepresence system also comprises a processor (not shown) coupled to the communication network 807 for processing data. In this example, head mounted device 804 comprises a helmet 803, display 802 and motion sensor 805 for sensing the movement of the head of a user. Alternatively, the head mounted device comprises other than a helmet. Alternatively, the head mounted device comprises an apparatus for fixing a display to a user's head. Alternatively, the video display 802 is other than coupled to the head mounted device 804. Pan and tilt apparatus 806 is located remotely from the user's location and comprises video camera 808 and motor (not shown) for moving the camera in three-dimensions. Alternatively, the pan and tilt apparatus 806 comprises a plurality of video cameras for providing stereoscopic vision to the user. Further alternatively, a plurality of motors are used for moving the cameras in 3 dimensions.

As the user moves their head to various positions, instructions are transmitted to the pan and tilt apparatus 806, via the communication network 807, instructing the pan and tilt apparatus 806 to move the video camera 808 such that it tracks the movement of the user's head. The movement of the pan and tilt apparatus 806 may lag the movement of the user's head. The lag depends on the speed of the user's head and the response time of the telepresence system. Video data is transmitted via the communication network 807 for displaying on display 802 the images captured by the video camera 808. For example, the user moves their head west as indicated by arrow 801, sensor 805 detects the motion and instructions are transmitted to the pan and tilt system 806 via communication system 807 to point toward the west. Pan and tilt apparatus 806 moves the video camera 808 towards the west as indicated by arrow 809. Image data showing west is transmitted to head mounted device 806 via communication network 807. As the user moves their head, the pan and tilt apparatus 806 follows, constantly transmitting video data for viewing by the user. Each position of the user's head corresponds to an aligned position of the pan and tilt apparatus 806. The user is 'virtually immersed' in the environment of the pan and tilt apparatus 806. In some embodiments the image is displayed on a video screen or a plurality of video screens.

Simultaneous to the movement of the user's head, feedback data indicating the instantaneous position of the pan and tilt apparatus 806 is provided to the processor. Also provided to the processor is the instantaneous position of the user's head. While in use, the pan and tilt apparatus 806 comes out of alignment with the position of the user's head. For example, the user's head is in position $\{x1, y1, z1\}$ however pan and tilt apparatus 806 is in position $\{x3', y3', z3'\}$. Comparing the feedback data with the known positions of the user's head, the misalignment is automatically detected by the processor. It takes a response time of tr for the pan and tilt apparatus 806 to 'catch up' to the position of the user's head. The processor detects the lag in the response of the pan and tilt apparatus. Optionally, the telepresence system provides an indication to the user that a misalignment has occurred due to a lag in response time of the system. For example, a visual cue appears on the display. Alternatively, an audible cue is provided to the user. Alternatively, a portion of the telepresence system vibrates to indicate a misalignment due to lag in response time to the user. Alternatively, response time lag is detected by another method.

Figure 9A:
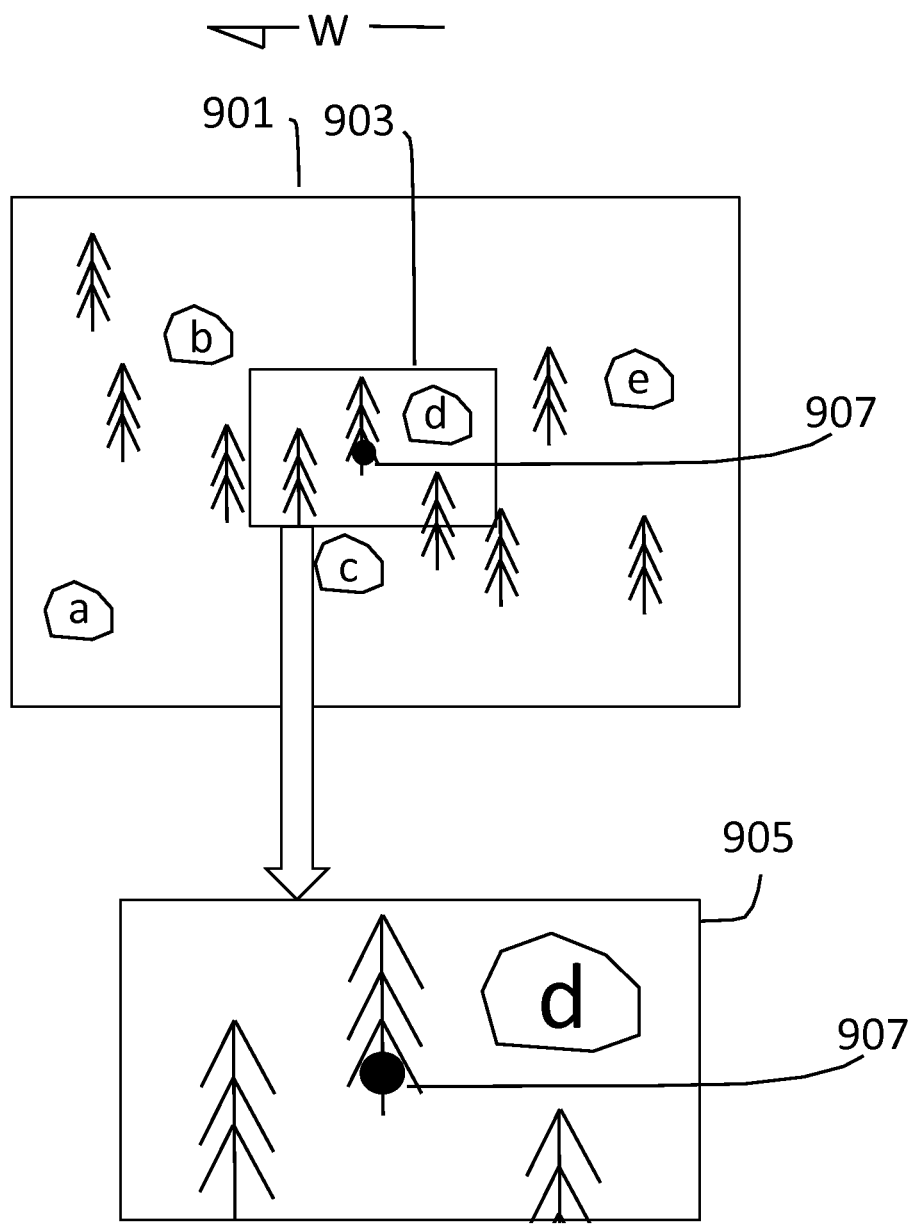
FIG. 9A is a simplified diagram of the field of capture imaged by a pan and tilt apparatus and a field of view of the user.

In typical telepresence systems, the field of capture of the video camera and the field of the view of a user overlap 100% and often both the field of capture and field view other than move. According to an embodiment of the invention, the field of view of a user of a telepresence system is a portion of the field of capture of the telepresence pan and tilt apparatus. Furthermore, the field of view moves relative to the field of capture and both the field of capture and field of view of the user move in alignment with the movement of the head of the user. Still referring to FIG. 8, pan and tilt apparatus 806 is for imaging a field of capture and head mounted device 803 displays an image on display 802 in the user's field of view. Shown in FIG. 9A is a simplified diagram of the field of capture 901 imaged by pan and tilt apparatus 806 and the field of view 905 of the user. Field of view 905 corresponds to a first portion 903 of the field of capture 901. In this example, the first portion 903 is in the center of field of capture 901, and thus, in the center of the field of view 905. Images captured in first portion 903 are transmitted via communication network 807 to the display 802 of head mounted device 803 and displayed on display 802 in the field of view 905 of the user. Alternatively, images captured by the field of capture 901 are transmitted via communication network 807 to the head mounted device 803 and only first portion 903 is displayed to the user. Alternatively, the images captured in the first portion 903 are transmitted to a server (not shown) coupled to communication network 807 and are then transmitted from the server to the head mounted device 803 for display. Further alternatively, images captured by field of capture 901 are transmitted via communication network 807 to the server (not shown) for processing and images captured in portion 903 are transmitted to the head mounted device 803 for display. Portion 903 corresponds to a position of pan and tilt apparatus 806 in alignment with the first position of the head of the user.

Figure 9B:
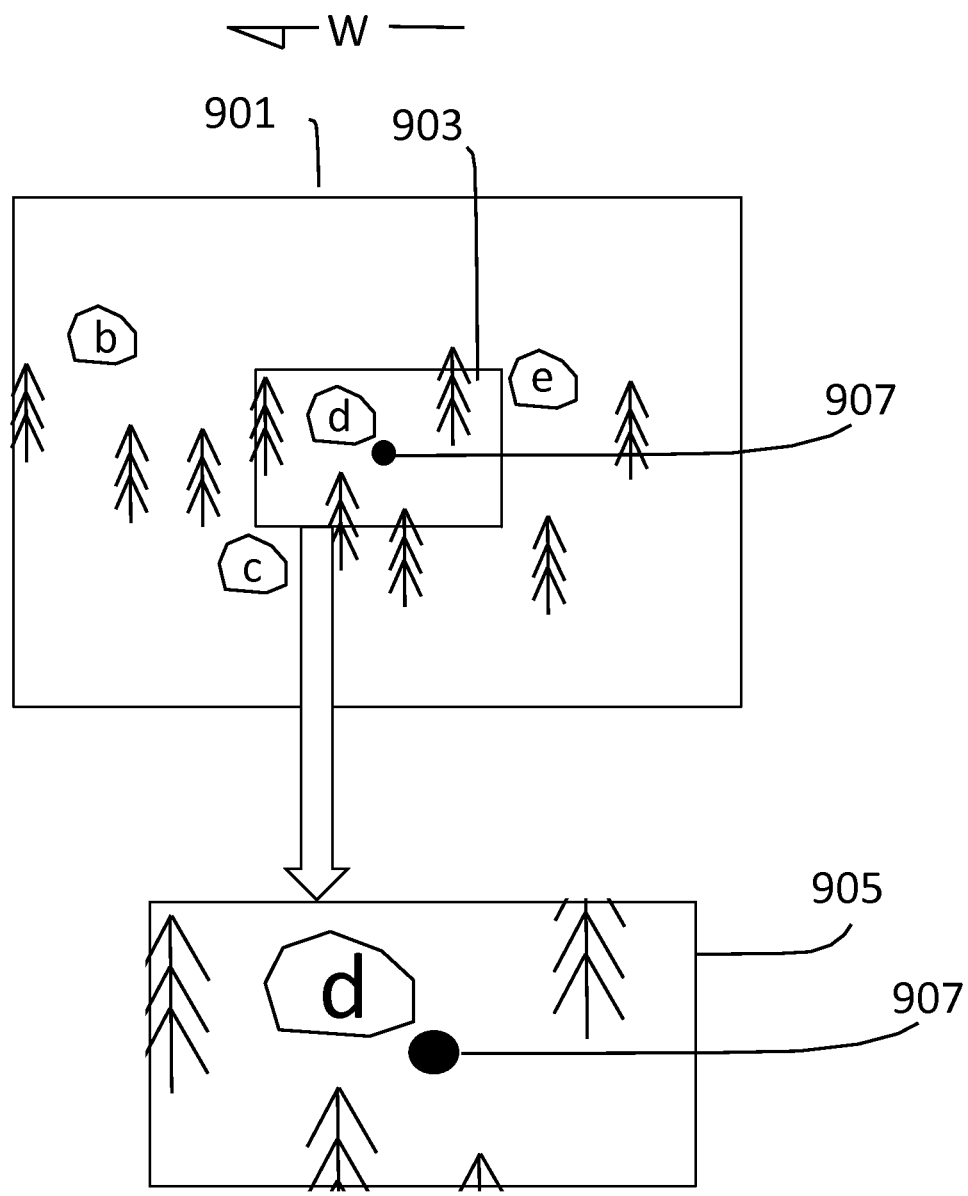
FIG. 9B is another simplified block diagram of a field of capture and first portion of a pan and tilt apparatus in alignment with the head of a user.

As the head of the user moves, pan and tilt apparatus 806 moves in alignment with the head of the user, capturing different images in the field of capture 901, and thus different images in the first portion 903. However the relative position of the first portion 903 within field of capture 901 other than changes. For example, the user moves their head from the first position in the example immediately above to a second position, wherein the second position is right of the first position and views the environment east of the original position. Shown is FIG. 9B is another simplified block diagram of the field of capture 901 and first portion 903 of the field of capture 901 in alignment with the head of the user in the second position. Also shown in FIG. 9B is the field of view 905 of the user. The first portion 903 remains in the center of the field of capture 901 although the position of the pan and tilt apparatus 806 has changed. The images captured in both the field of capture 901 and field of view 905, as shown in FIG. 9B, are of the landscape east of the landscape in the images captured in FIG. 9A.

Figure 10:
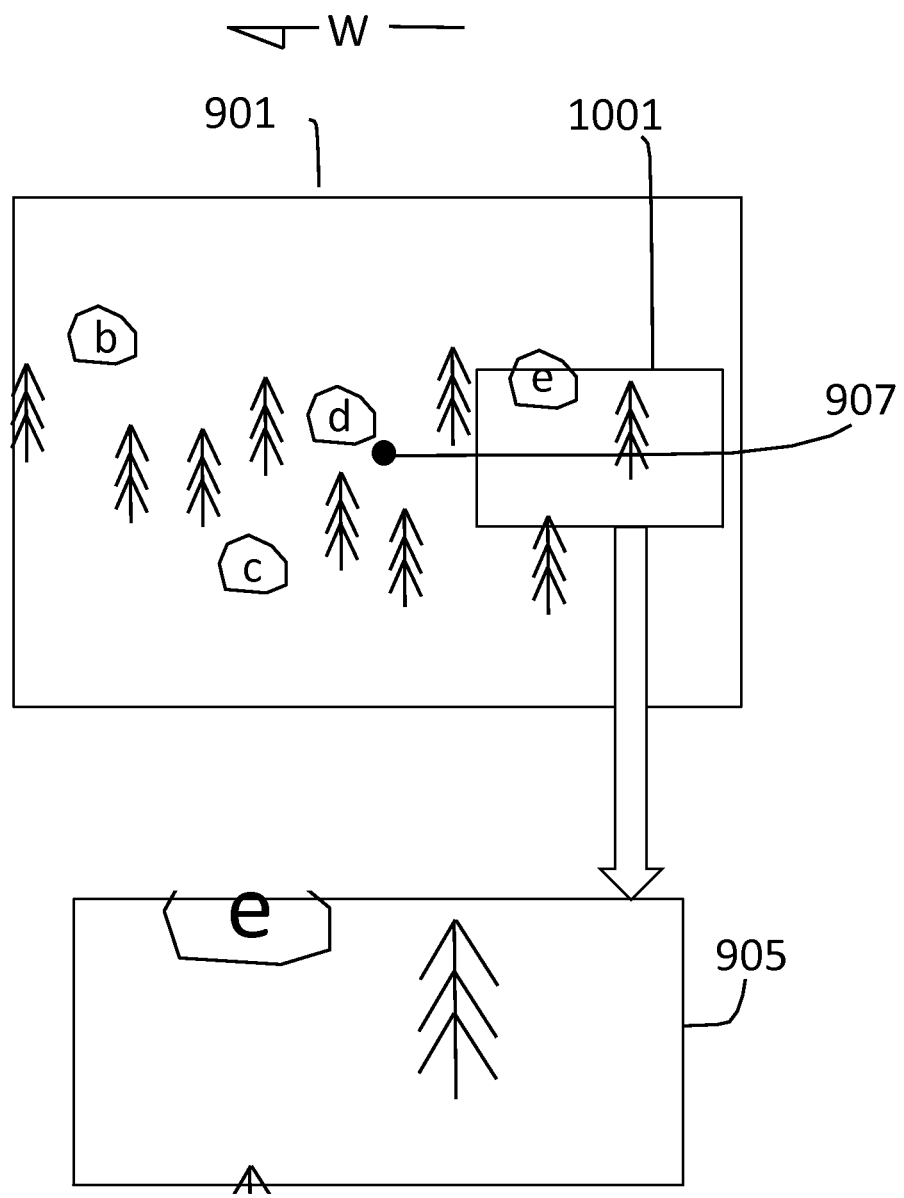
FIG. 10 is a simplified diagram of a field of capture imaged by a pan and tilt system and a field of view of a user of a telepresence system when the telepresence system is 'out of range.'

Shown in FIG. 10 is a simplified diagram of the field of capture imaged by pan and tilt system 806 and field of view 905 of the user of telepresence system 800 when the telepresence system is 'out of range'. For example, the user moves their head to a third position 'out of range' of the pan and tilt system 806, wherein a position 'out of range' is a position of the head of the user corresponding to a position of the pan and tilt apparatus 806 outside of the operating range of the pan and tilt apparatus 806. For example, the angular operating range for East-West movement of the pan and tilt apparatus 806 is limited to 45° from a point of origin. The user moves their head to an easterly position—the third position—that corresponds to an aligned position of the pan and tilt apparatus 806 that is outside the angular operating range. In other words, for the pan and tilt apparatus 806 to maintain alignment with the third position of user's head pan and tilt apparatus 806 would have to turn east at an angle greater than 45° from the point of origin. The pan and tilt apparatus 806 tracks the position of the head of the user until it reaches it's range limit—45° from the point of origin—where it stays until the position of the head of the user comes 'back into range'. Thus the field of capture 901 is fixed in position. Compensating for the inability of the pan and tilt apparatus 806 to maintain alignment with the third position of the head of the user, a second portion 1001 of the field of capture 901, from which images are transmitted to the field of view 903, is located to the right of the first portion 903, simulating that the pan and tilt apparatus 806 is still in alignment with the third position of the user's head. The second portion 1001 of field of capture 901 captures images from a 'virtual' position of the pan and tilt apparatus 806 corresponding to the third position of the user's head. As the user continues to move their head further east, images from other more easterly portions of the field of capture 901 are transmitted to the display 802. Alternatively, a position 'out of range' comprises a position of the head of the user corresponding to a position of the pan and tilt apparatus outside of the operating linear range of the pan and tilt apparatus 806. Optionally, any telepresence system as described above automatically detects that the position of the user's head is 'out of range'. Further optionally, an indication that the position of the user's head is 'out of range' is provided. A specific and non-limiting example is a visual cue such as a light flashing. Alternatively, an audible cue is provided to the user. Alternatively, a portion of the telepresence system vibrates to indicate the 'out of range' condition.

According to an embodiment of the invention, the portion of the field of capture of a pan and tilt apparatus displayed to a user moves to compensate for unintentional movement of the vehicle upon which the pan and tilt system is coupled. For example, the vehicle motor causes the vehicle to vibrate. To counter the vibration, the portion of the field of capture displayed to the user moves opposite to the direction of the vehicle vibration. Thus the image displayed to the user other than vibrates. Alternatively, the user is coupled to the vehicle.

Though the above description speaks of 'out of range' being beyond a range of motion of the pan and tilt system, another way that a system is out of range is when a movement of one part of the system is misaligned with a movement of the other part of the system, even if only briefly. This occurs commonly when starting to move a users head, moving a user's head quickly, and when a resolution of motion of the pan and tilt system—for example using a stepper motor—is larger than a resolution of an image pixel within the field of capture. Thus, the field of view is moved relative to the field of capture in order to compensate for these brief misalignments and/or resolution related issues even while the pan and tilt system is capable of aligning with the head mounted device but simply is not so aligned.

The embodiments presented are exemplary only and persons skilled in the art would appreciate that variations to the embodiments described above may be made without departing from the scope of the invention.

What is claimed is:

1. A method comprising:
moving a remote pan and tilt system for alignment with a first relative position of a user's head to place the remote pan and tilt system in a first aligned position, the remote pan and tilt system comprising a camera, the remote pan and tilt system being characterized by a field of capture being a field of view of the camera when in any particular position of the remote pan and tilt system;
providing to a field of view of the user a first image from the remote pan and tilt system in the first aligned position within the field of capture of the remote pan and tilt system in the first aligned position, the first image correlating to the first relative position of the head of the user, the first image comprising only a first portion less than an entirety of the field of capture of the remote pan and tilt system in the first aligned position;
receiving a signal from a head mounted device indicative of movement of the head of the user to a second relative position and determining that the remote pan and tilt system is in a second misaligned position misaligned with the second relative position of the head of the user;
providing to the field of view of the user a second image from the remote pan and tilt system in the second misaligned position within the field of capture of the remote pan and tilt system in the second misaligned position, the second image correlating to the second relative position of the user's head, the second image comprising only a second portion less than an entirety of the field of capture of the remote pan and tilt system in the second misaligned position, wherein the second portion is selected based on the second relative position of the user's head for correlation of the second image to the second relative position of the user's head, and wherein the second portion is different from the first portion.

2. The method according to claim 1 further comprising:
moving the remote pan and tilt system for alignment with a third relative position of the user's head different from the first relative position to place the remote pan and tilt system in a third aligned position different from the first aligned position;
providing to the field of view of the user a third image from the remote pan and tilt system in the third aligned position within the field of capture of the remote pan and tilt system in the third aligned position, the third image correlating to the third relative position of the head of the user, the third image comprising only the first portion less than the entirety of the field of capture of the remote pan and tilt system in the third aligned position.

3. The method according to claim 1, wherein determining that the remote pan and tilt system is in the second misaligned position misaligned with the second relative position of the head comprises determining that the pan and tilt system is unable to move for alignment with the second relative position of the user's head.

4. The method according to claim 1, wherein:
determining that the remote pan and tilt system is in the second misaligned position misaligned with the second relative position of the head of the user comprises detecting that the second relative position corresponds to a position out of range for the remote pan and tilt system.

5. The method according to claim 4, wherein the position out of range comprises a position of the head of the user corresponding to a position of the pan and tilt position outside of one of the operating linear range and operating angular range of motion of the pan and tilt system.

6. The method according to claim 4 comprising providing the user an indication that the pan and tilt system is out of range.

7. The method according to claim 1, wherein:
the first portion is in a fixed position relative to the field of capture of the remote pan and tilt system.

8. The method according to claim 1, wherein:
the field of capture in the second misaligned position is fixed.

9. The method according to claim 1, wherein the field of capture of the remote pan and tilt system is fixed relative to the pan and tilt system.

10. The method according to claim 1, wherein the movement of the head of the user is a second movement, the signal indicative of the second movement of the head of the user is a second signal, and the pan and tilt system is coupled to a vehicle, the method comprising:
sensing with a first sensor a first movement of the user's head to the first relative position;
providing by the first sensor a first signal indicative of the first movement of the head of the user;
sensing with a second sensor coupled to the vehicle a movement of the vehicle;
providing by the second sensor a third signal indicative of the movement of the vehicle; and
cancelling from the first signal the third signal indicative of the movement of the vehicle to provide a fourth signal,
wherein moving the remote pan and tilt system for alignment with the first relative position of the user's head to place the remote pan and tilt system in the first aligned position comprises moving the pan and tilt system in correlation with the fourth signal.

11. The method according to claim 10, wherein the user is a passenger of the vehicle, the cancelling for removing motion of the head of the user resulting from motion of the vehicle.

12. The method according to claim 10, wherein the pan and tilt system is aboard the vehicle, the cancelling for removing motion artifacts within feedback from the vehicle.

13. The method according to claim 11 comprising filtering high frequency motion of the vehicle without filtering low frequency motion of the vehicle.

14. The method according to claim 12 comprising filtering high frequency motion of the vehicle without filtering low frequency motion of the vehicle.

15. The method according to claim 1 comprising:
moving the pan and tilt system from the first aligned position correlating to the first relative position of the head of the user to a third aligned position different from the first aligned position and the second misaligned position, wherein the second misaligned position is one of a sequence of positions in a path of movement of the pan and tilt system from the first aligned position to the third aligned position correlating to the second relative position of the head of the user.

16. The method according to claim 15 comprising detecting that a rate of movement of the head of the user from the first relative position to the second relative position is greater than a rate of movement of the pan and tilt system.

17. The method according to of claim 16 comprising providing the user an indication that the rate of movement of the head of the user is greater than the rate of movement of the pan and tilt system.

18. The method according to claim 1 comprising providing the user an indication that the pan and tilt system is misaligned when the pan and tilt system is in a misaligned position.

19. The method according to claim 1, wherein the pan and tilt system and the head mounted device have different rates of movement, and the second portion of the field of capture is selected for the second image provided to the field of view of the user to compensate for the different rates of movement, the different rates of movement resulting in relative movement of the pan and tilt system and the head mounted device out of an aligned position.

20. A method comprising:
selectably operating a pan and tilt system video feedback in a first mode of operation and a second mode of operation different from the first mode of operation, the pan and tilt system comprising a camera, the pan and tilt system being characterized by a field of capture being a field of view of the camera in a particular position of the pan and tilt system, the first mode of operation selected when motion of a head of a user is within a range of motion of the pan and tilt system and the second mode of operation selected when motion of the head of the user is outside the range of motion of the pan and tilt system;

while in the first mode of operation, providing a first image from the pan and tilt system within the field of capture of the pan and tilt system to a field of view of the user, the first image captured from a position of the pan and tilt system correlating to a first relative position of the head of the user, the first image comprising only a first portion less than an entirety of the field of capture of the pan and tilt system;

while in the second mode of operation, providing a second image from the pan and tilt system within the field of capture of the pan and tilt system to the field of view of the user, the second image correlating to a second relative position of the head of the user, the second image comprising only a second portion less than an entirety of the field of capture of the pan and tilt system, wherein the second portion is selected based on the second relative position of the user's head for correlation of the second image to the second relative position of the user's head, and wherein the second portion is different from the first portion.

21. The method according to claim 20, wherein outside the range of motion of the pan and tilt system corresponds to a position of the pan and tilt system outside of one of an operating linear range and an operating angular range of motion of the pan and tilt system.

22. The method according to claim 20, wherein outside the range of motion of the pan and tilt system corresponds to a rate of movement of the head of the user greater than a supported rate of movement of the pan and tilt system.

23. The method according to claim 20, wherein the first portion is in a fixed position relative to the field of capture of the remote and pan tilt system.

24. The method according to claim 20 comprising providing the user an indication that the motion of the head of the user is outside the range of motion of the pan and tilt system.

* * * * *